United States Patent [19]
Blair

[11] Patent Number: 5,301,729
[45] Date of Patent: Apr. 12, 1994

[54] DUAL CHAMBER SAFETY TIRE

[76] Inventor: Johnny E. Blair, P.O. Box 16, Van, W. Va. 25206

[21] Appl. No.: 919,748

[22] Filed: Jul. 27, 1992

[51] Int. Cl.$^5$ .............................................. B60C 5/22
[52] U.S. Cl. ................... 152/342.1; 152/518; 152/429
[58] Field of Search .............. 152/427, 429, 331.1, 152/339.1, 340.1, 341.1, 342.1, 343.1, 344.1, 525, 516, 518

[56] References Cited

U.S. PATENT DOCUMENTS

| | | | |
|---|---|---|---|
| 2,375,127 | 5/1945 | Mendelsohn | 152/339.1 |
| 2,680,463 | 6/1954 | Khalil | 152/339.1 |
| 2,713,372 | 7/1955 | Darrow | 152/342.1 |
| 3,034,558 | 5/1962 | Steer et al. | 152/429 |
| 4,318,436 | 5/1982 | Shurman | 152/525 X |
| 4,995,438 | 2/1991 | Weber et al. | 152/339.1 X |

Primary Examiner—Michael W. Ball
Assistant Examiner—Francis J. Lorin
Attorney, Agent, or Firm—George J. Neilan

[57] ABSTRACT

A safety tire is provided having an outer tire with treads and a puncture resistant inner tire defining inner and outer chambers, a first inflation/deflation valve extending through the sidewall of the outer tire into the outer chamber, a one-way valve to enable air flow from the outer chamber to the inner chamber, and a second inflation/deflation valve extending through the rim of the tire into the inner chamber.

2 Claims, 1 Drawing Sheet

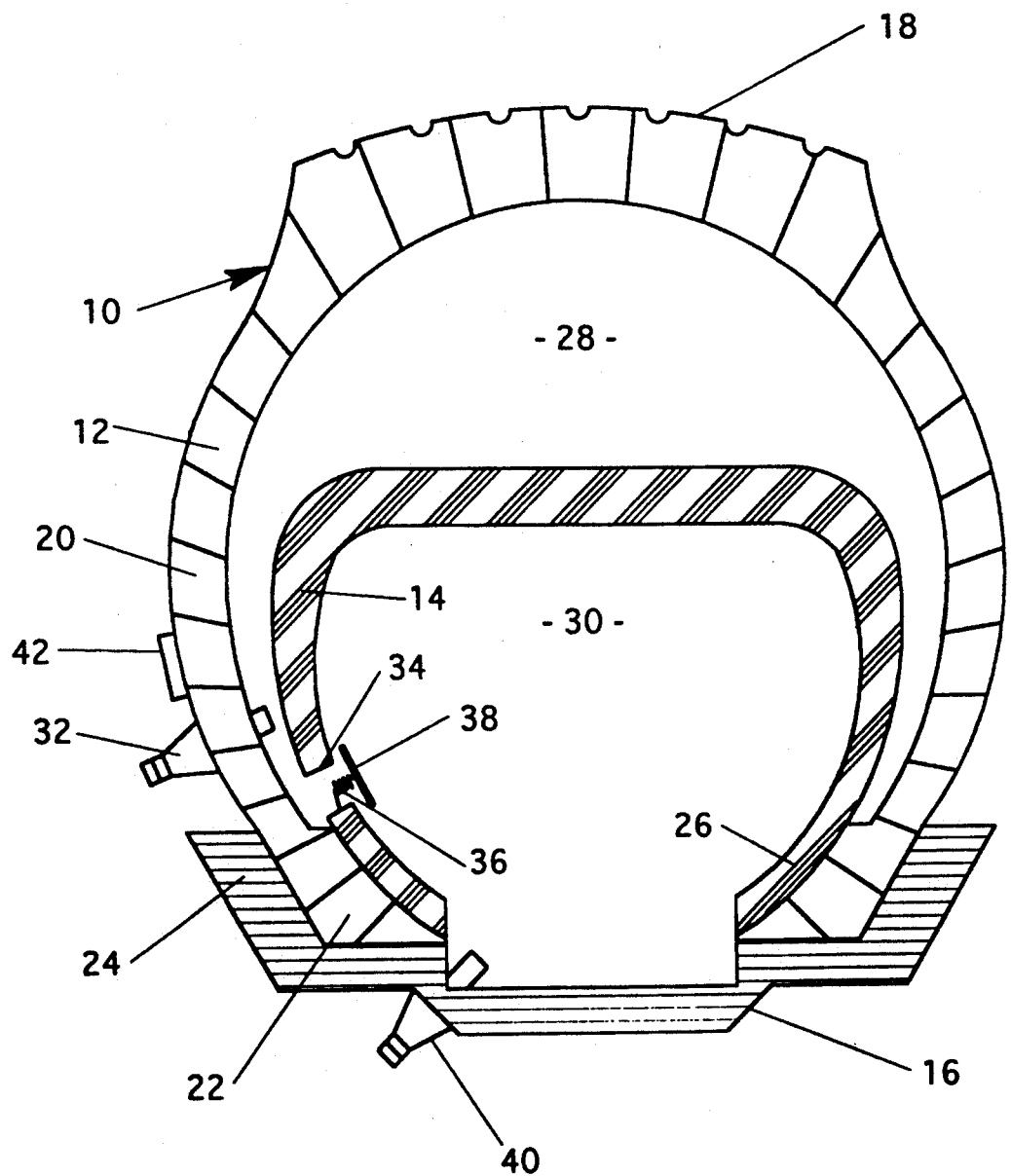

DUAL CHAMBER SAFETY TIRE

FIELD OF THE INVENTION

The present invention relates to safety tires, i.e. tires that when punctured will not completely deflate and will provide the vehicle operator with improved vehicle control to reduce accidents and injuries. More specifically, the invention relates to dual chamber tubeless pneumatic safety tires for vehicles that have an inner tire to sustain the load of a vehicle when the outer tire has been punctured and has lost its air pressure.

BACKGROUND OF THE INVENTION

A blowout of a conventional vehicle tire at high speed can cause a vehicle to go out of control and cause injury or death. If an immediate accident is avoided, a punctured tire may strand the operator on a highway or other unsafe place.

In order to minimize the dangers in the event of a tire blowout or other accidental deflation of a tire; various proposals have been made to prevent complete tire deflation and to provide the operator with additional vehicle control during the blowout.

U.S. Pat. No. 4,293,017 discloses a dual chamber tire with an air inlet valve in the rim for an inner chamber and a second air inlet valve in the rim for the outer chamber.

U.S. Pat. No. 2,122,740 discloses a tube within a tube with both tubes being filled with air through a single stem carrying two valves.

U.S. Pat. No. 3,025,902 discloses a dual chamber tubeless tire with an inner chamber inflated by a rim valve and an outer chamber inflated by a valve in the outer tire sidewall. In this device, if the outer chamber is inflated first, the inner diaphragm could be pressed inwardly to the rim to an unsafe position. Furthermore, if the rim valve developed a slow air leak, the tire could separate from the rim while the outer tire remained fully inflated and appeared to be safe to drive on.

U.S. Pat. No. 2,871,904 discloses a dual chamber tubeless tire in which an inner chamber is inflated by a ri-m valve and an outer chamber is inflated along with the inner chamber via a first one way valve in the inner diaphragm. A second one way valve in the diaphragm permits air flow in the opposite direction, from the outer chamber to the inner chamber. In this tire, the vehicle operator cannot inflate, gauge or deflate the outer chamber directly. Also, the operator cannot verify that the one way valves are working correctly or wheather the inner diaphragm can sustain the vehicle load if the outer tire is punctured and loses its air pressure. Such faults might make a tire manufacturer responsible for the safe and correct wear of outer tire treads and for potentially unsafe conditions upon installation of the tire. Applicant theorizes that such concerns have kept such tires out of the market.

SUMMARY OF THE INVENTION

A primary object of my invention is to provide an improved dual chamber safety tire requiring a one way valve extending through the inner tire in fluid communication with an outer tire sidewall valve means and in fluid communication with a rim valve means to enable said dual chamber safety tire to reduce tire failures that cause accidents and injuries.

Another object of my invention is to provide an improved dual chamber safety tire that reduces the potential liability of the tire manufacturer.

Another object of my invention is to provide means for the vehicle operator to select the air pressures in the inner and outer chambers independently of each other.

Still another object of my invention is to provide means for the vehicle operator to inflate the inner chamber to a higher pressure than the outer chamber pressure to verify the inner tire will sustain the vehicle load.

Briefly, my invention comprises a dual chamber safety tire with an outer tire and a puncture resistant inner tire disposed to form an outer chamber between the outer tire and the inner tire and an inner chamber between the inner tire and the rim. A first inflation and deflation valve extends through the sidewall into the outer chamber. A one way valve extends through the inner tire to provide air flow from the outer chamber to the inner chamber to enable the first valve to inflate both the outer chamber and the inner chamber. A second inflation and deflation valve extends through the rim into the inner chamber to enable inflation of the inner chamber to a higher pressure than in the outer chamber, and to enable concurrent deflation of both the inner and outer chambers. The first and second inflation and deflation valves enable independent measurement of the air pressure in their respective chamber. An inability to maintain a higher pressure in the inner chamber than in the outer chamber indicates a defect.

BRIEF DESCRIPTION OF THE DRAWING

The sole FIG. 1 is a fragmentary cross-sectional view in elevation of a preferred embodiment of my invention.

DETAILED DESCRIPTION OF THE INVENTION

Referring to the drawing, the dual chamber safety tire 10 mounted on a tire rim 16 includes an outer tire 12, an inner tire 14 and valves 32, 34 and 40.

The outer tire 12 is made of conventional material and has treads 18 for (engagement with a roadway and has sidewalls 20. Sidewalls 20 have peripheral edges 22 of increased thickness that are secured within outwardly flaring walls 24 of the rim 16.

The inner tire 14 is made puncture resistant with conventional materials. The inner tire 14 has peripheral edge portions 26 that are attached to the inward sides of sidewalls 20.

The inner tire 14 is smaller than the outer tire 12 and is spaced from it to form an outer chamber 28. An inner chamber 30 is formed by the inside of the inner tire and the rim 16.

A first inflation and deflation valve 32 extends through sidewalls 20 of the outer tire 12 to pressurize and depressurize the outer chamber 28 and via one way valve 34, that extends through the inner tire 14, pressurizing inner chamber 30 equally with outer chamber 28.

One way valve 34 includes a tension spring 36 which normally biases a closure member 38 to a closed position. The one way valve 34 allows air flow from the outer chamber 28 to the inner chamber 30 when the pressure in the outer chamber 28 is greater than the pressure in the inner chamber 30 and the differential overcomes the bias of spring 36. When the inner chamber 30 pressure is greater than the outer chamber 28 pressure, the tension spring 36 bias will close the closure member 38 and retain the inner chamber 30 pressure from the outer chamber 28. It is to be understood, valve 34 can be made any conventional way that may be required for the size and safety of the valve 34 being made.

A second inflation and deflation valve 40 extends through the rim 16 into the inner chamber 30. Valve 40 enables the vehicle operator to inflate the inner chamber 30 independently of the pressure in the outer chamber 28. Normally valve 40 will be used to inflate the inner chamber 30 to a higher pressure than that in the outer chamber 28. Indicia 42 on the sidewalls 20 close to valve 32 are provided to recommend appropriate air pressures in chamber 28 and chamber 30.

If valve 40 is used to partially deflate the inner chamber 30 and the pressure therein is reduced to below the pressure in the outer chamber 28; one way valve 34 will open and further deflation via valve 40 will reduce the pressure in both the inner chamber 30 and outer chamber 28 equally.

It should be noted that tire 10 has means for the vehicle operator to inflate, gauge and deflate outer chamber 28 and inner chamber 30 independent. The vehicle operator should be responsible for maintaining proper inflation pressures, thereby reducing a manufacturer's potential liability.

The one way valve 34 during inflation of the outer chamber 28 via valve 32 prevents the inner tire 14 being deformed to an unsafe position by valve 34 opening to equalize the pressure between outer chamber 28 and inner chamber 30 when outer chamber 28 pressure becomes greater than inner chamber 30 pressure.

If an operator cannot maintain the inner chamber 30 at a higher pressure than the pressure in the outer chamber 28; this is an indication of a defect, e.g. that one way valve 34 is not working properly or inner tire 14 is defective, and dual chamber safety tire 10 should be repaired or replaced.

I claim:

1. Apparatus comprising a rim and a dual chamber inflatable safety tire mounted on said rim, said tire comprising an outer tire having treads for engagement with a roadway, said outer tire having sidewalls, an inner tire disposed within said outer tire forming an outer chamber between said outer tire and said inner tire and forming an inner chamber between said inner tire and said rim, first inflation and deflation valve means extending through said sidewalls and spaced from said rim into said outer chamber to enable a vehicle operator to measure and thereby be responsible for the correct air pressure in said outer chamber and the correct wear of said treads, a one way valve extending through said inner tire to provide for air flow from said outer chamber to said inner chamber to that said first inflation and deflation valve means may inflate both said outer chamber and said inner chamber to equalize air pressures thereby presenting the outer chamber air pressure from pressing said inner tire inward to said rim to an unsafe position when inflating said outer chamber before inflating said inner chamber, second inflation and deflation valve means extending through said rim into said inner chamber to enable a vehicle operator to measure and thereby be responsible for the inflation of said inner chamber to a higher pressure than said outer chamber and to enable deflation of both said inner chamber and said outer chamber, said first and said second inflation and deflation valve means providing means to provide for independent measurement of air pressure in said inner and outer chambers whereby the inability to maintain a higher pressure in said inner chamber than in said outer chamber indicates a defect.

2. Apparatus according to claim 1, further comprising indicia provided on the outside of said sidewalls to indicate recommended appropriate inflation pressures for said inner and outer chambers.

* * * * *